INVENTORS
E.F. EGER
W.O. SIMPSON
BY C.N. Hamilton
ATTORNEY

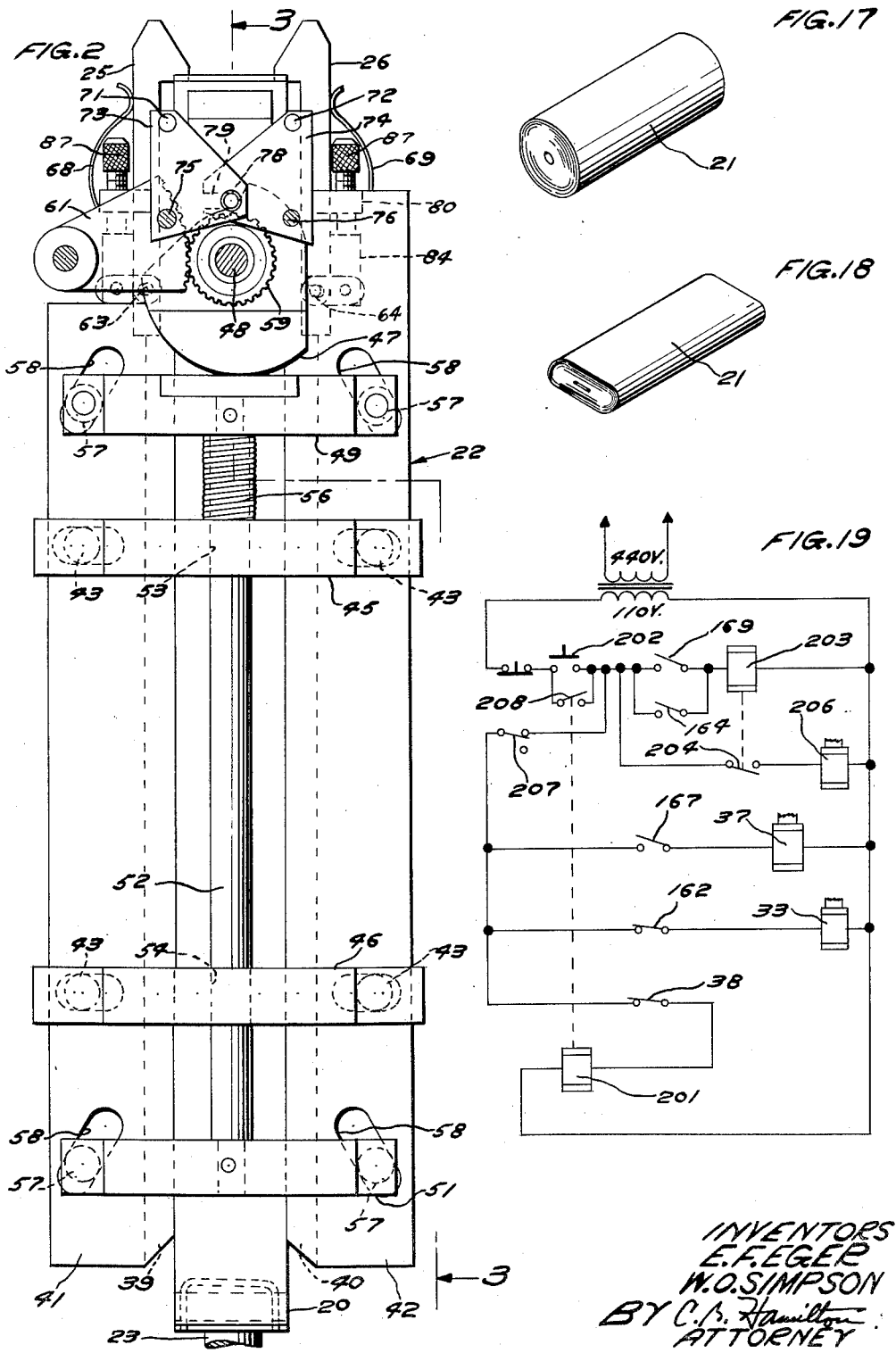

Jan. 23, 1962  E. F. EGER ET AL  3,018,008
RACK LOADING MACHINE
Filed Jan. 9, 1957  12 Sheets-Sheet 3
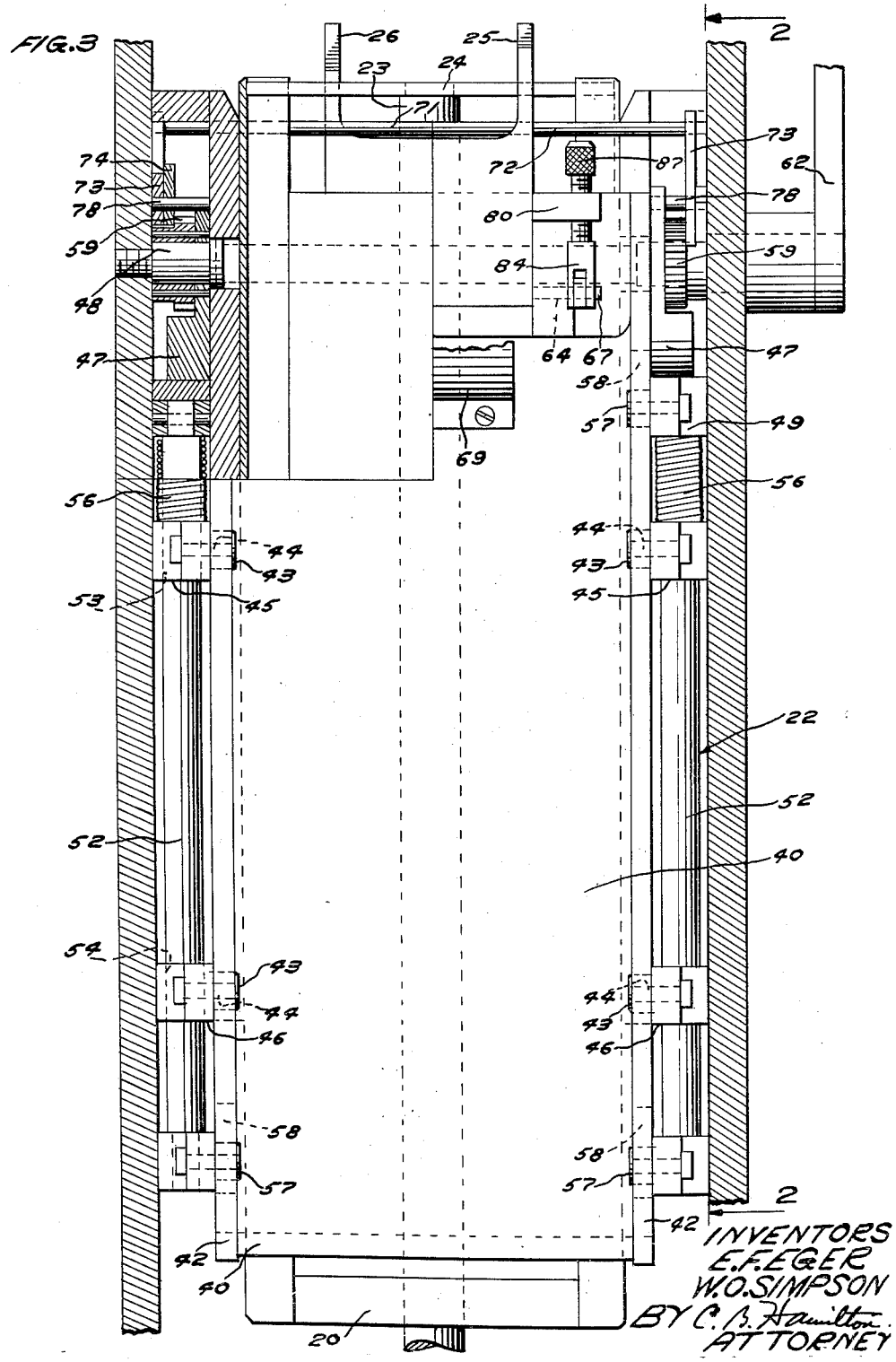
INVENTORS
E. F. EGER
W. O. SIMPSON
BY C. B. Hamilton
ATTORNEY

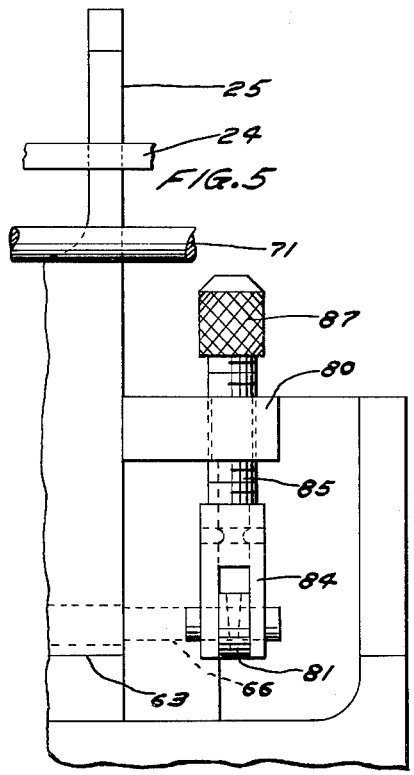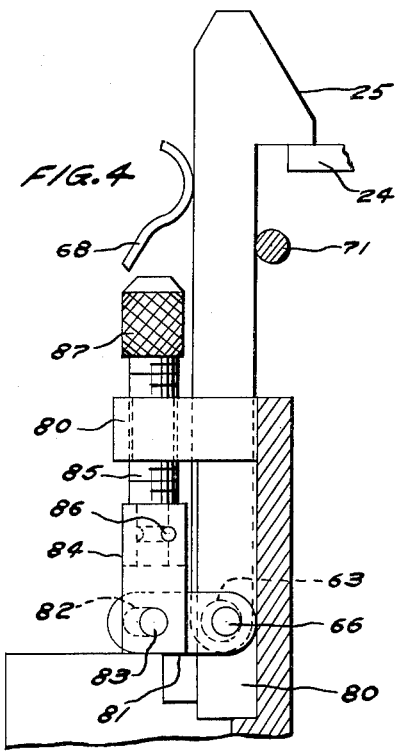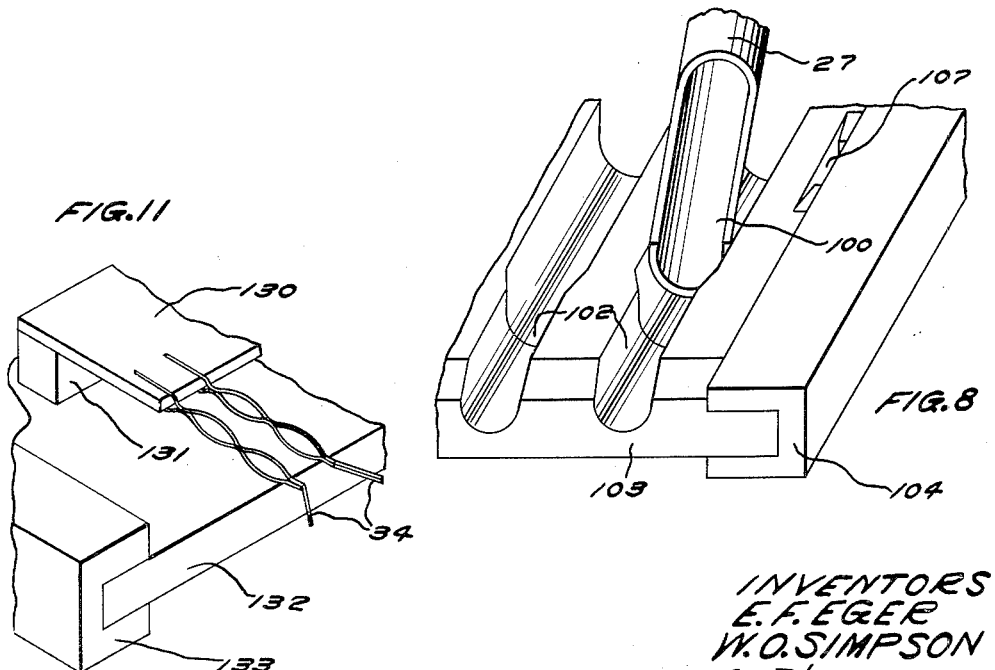

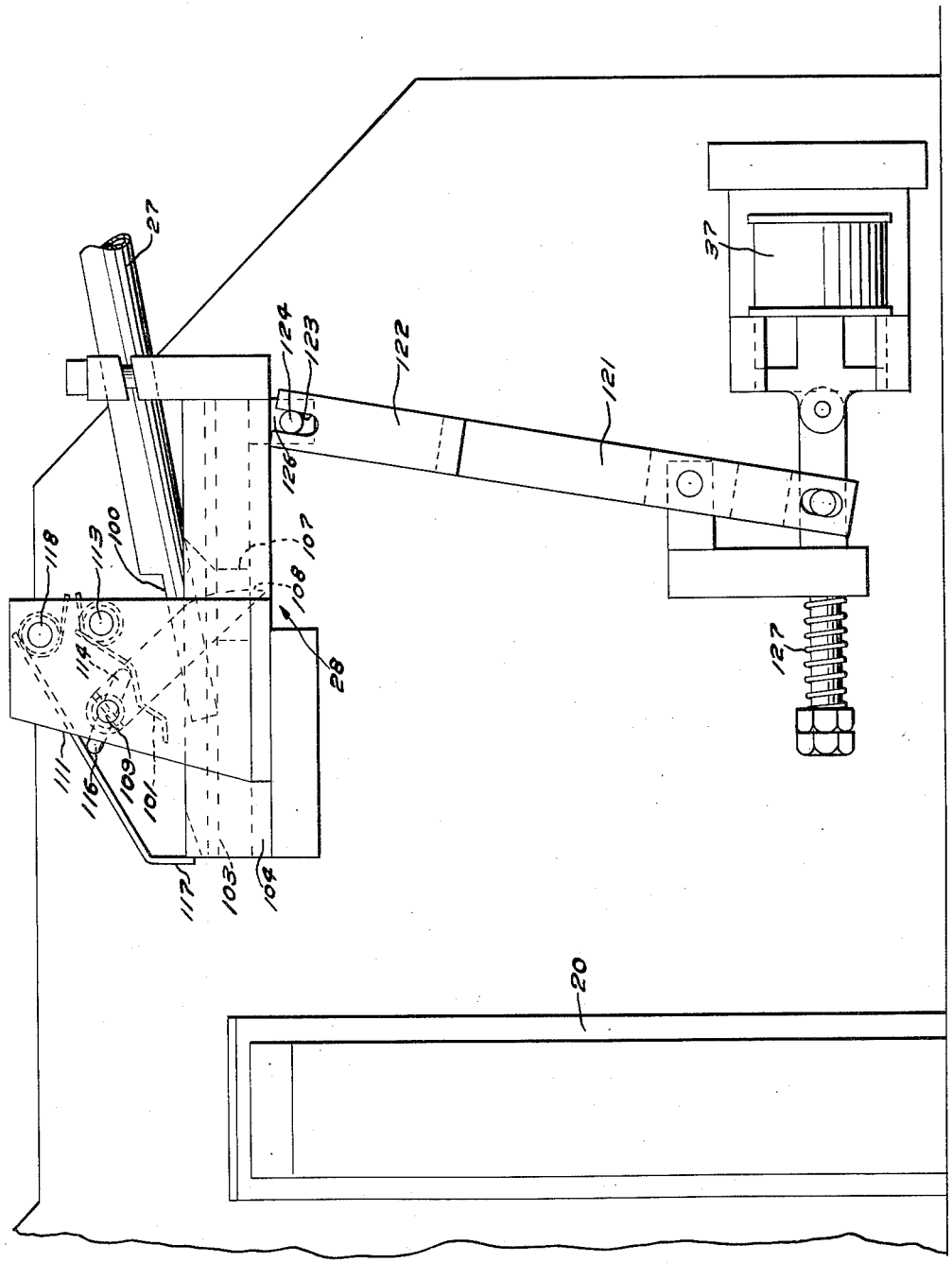

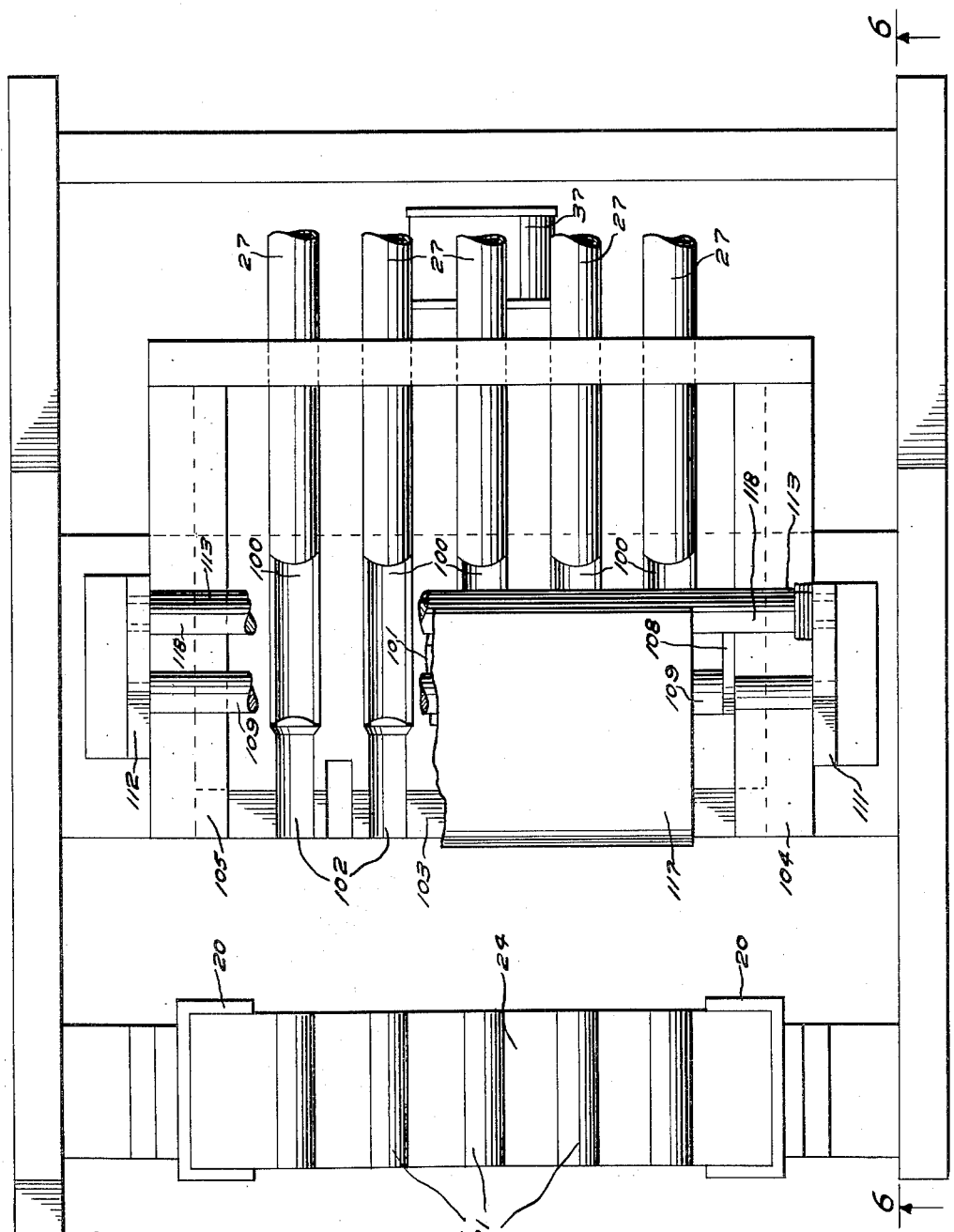

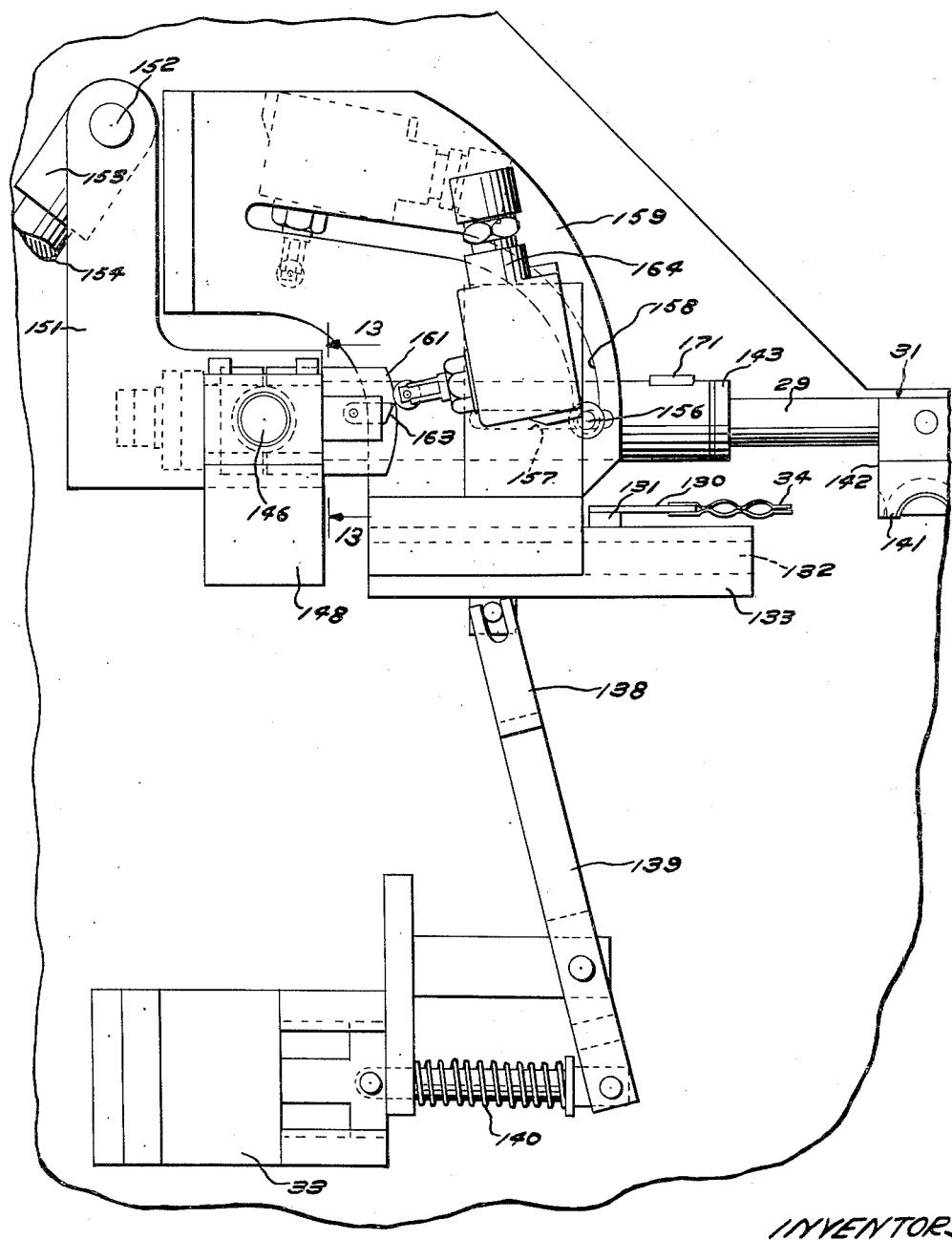

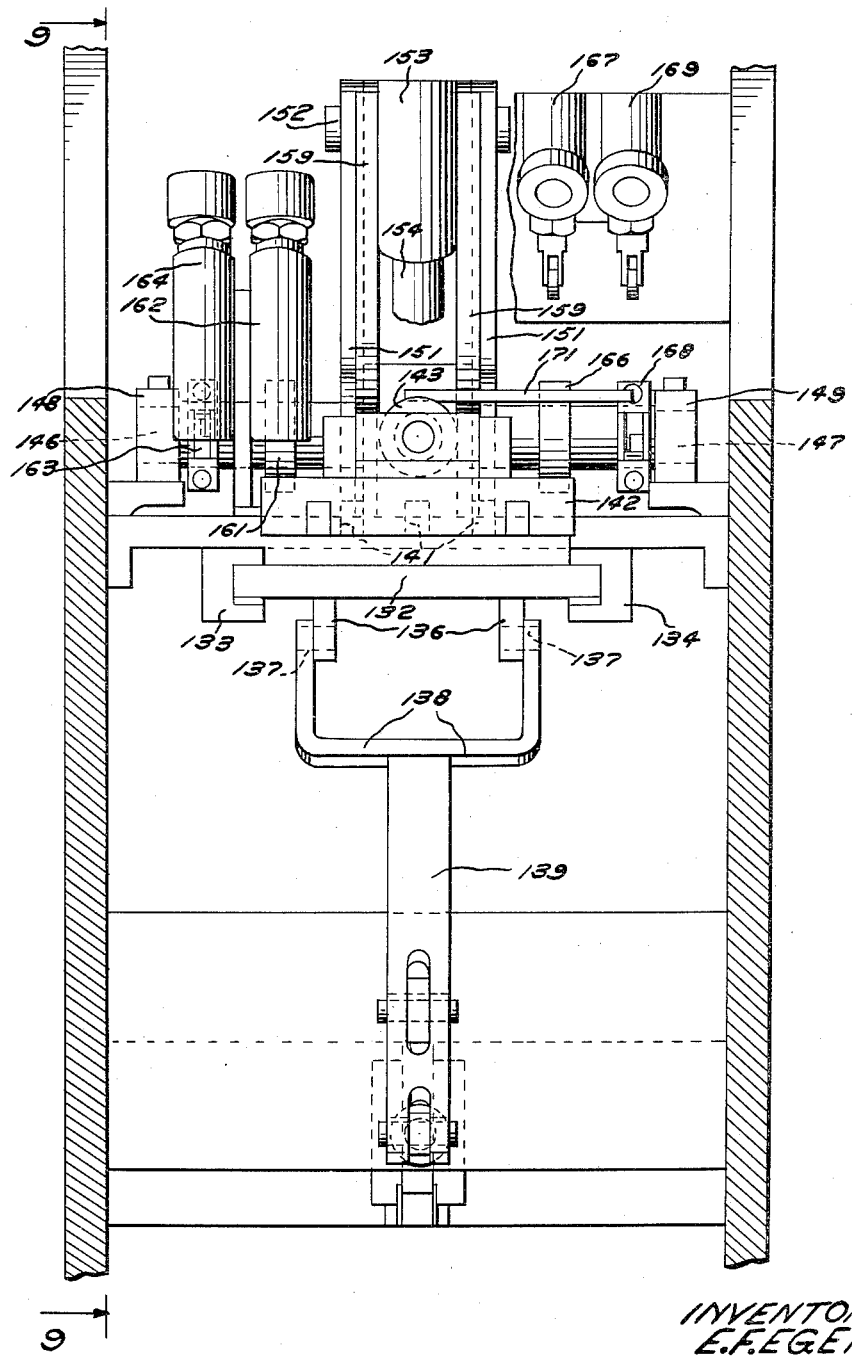

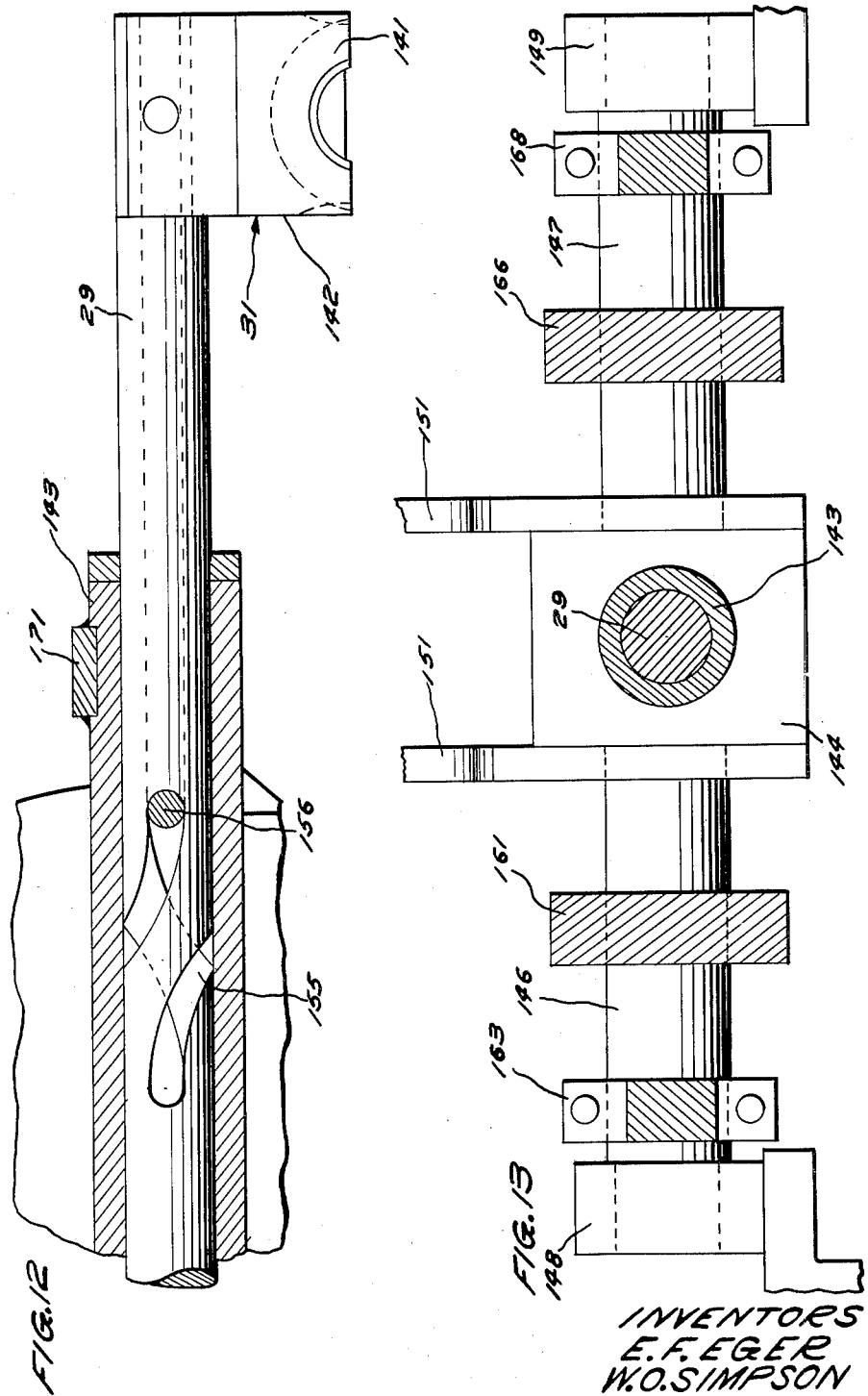

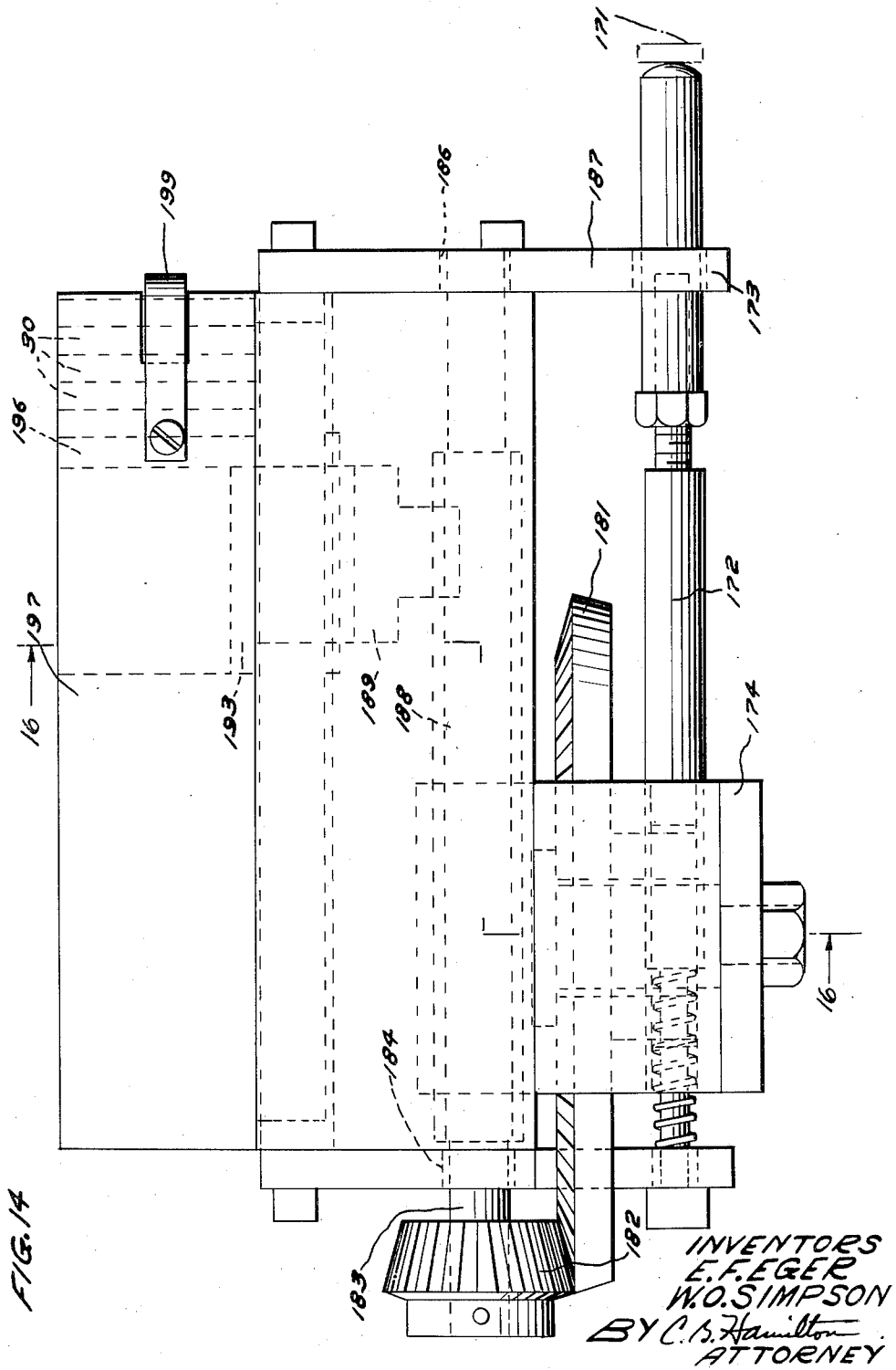

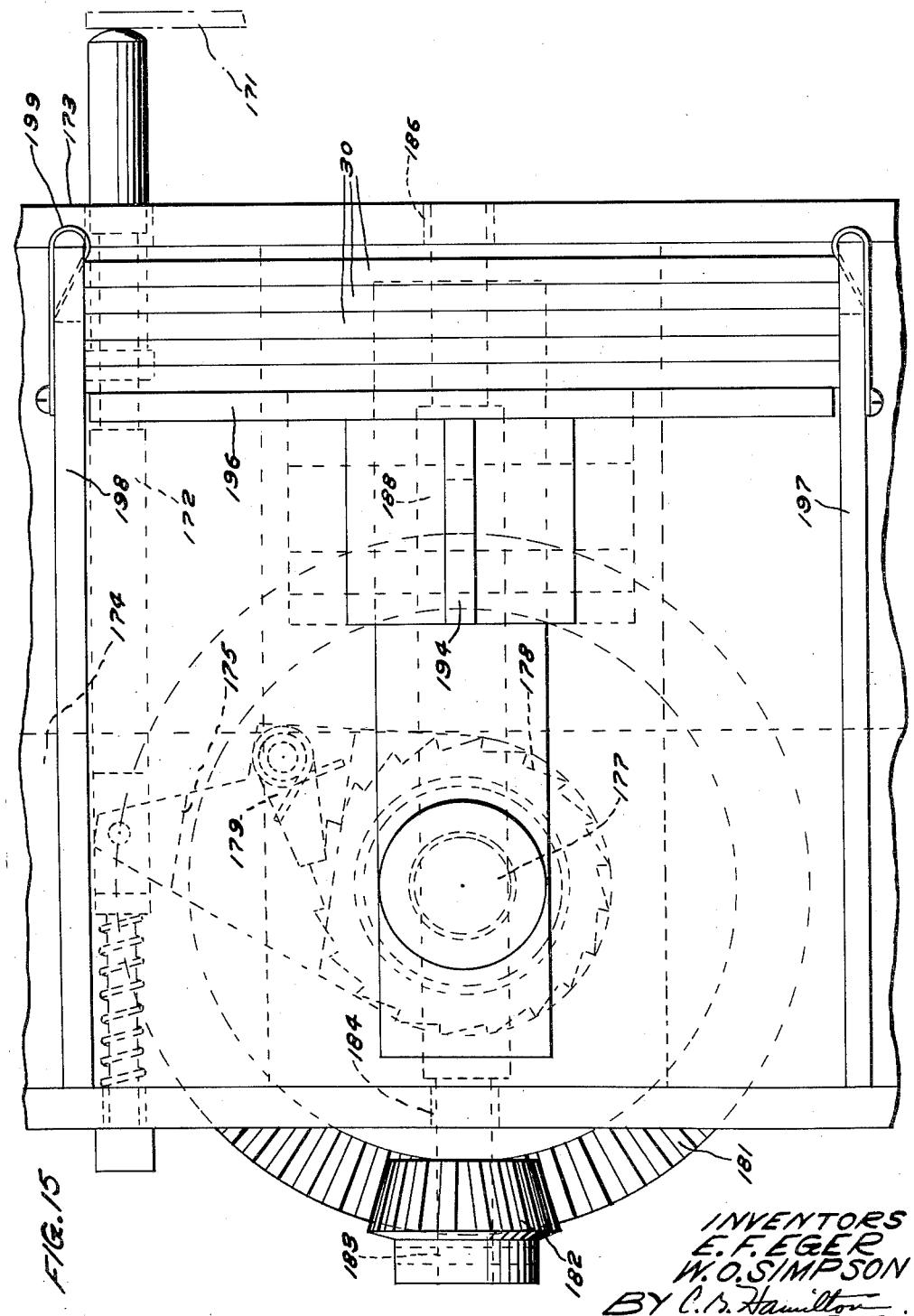

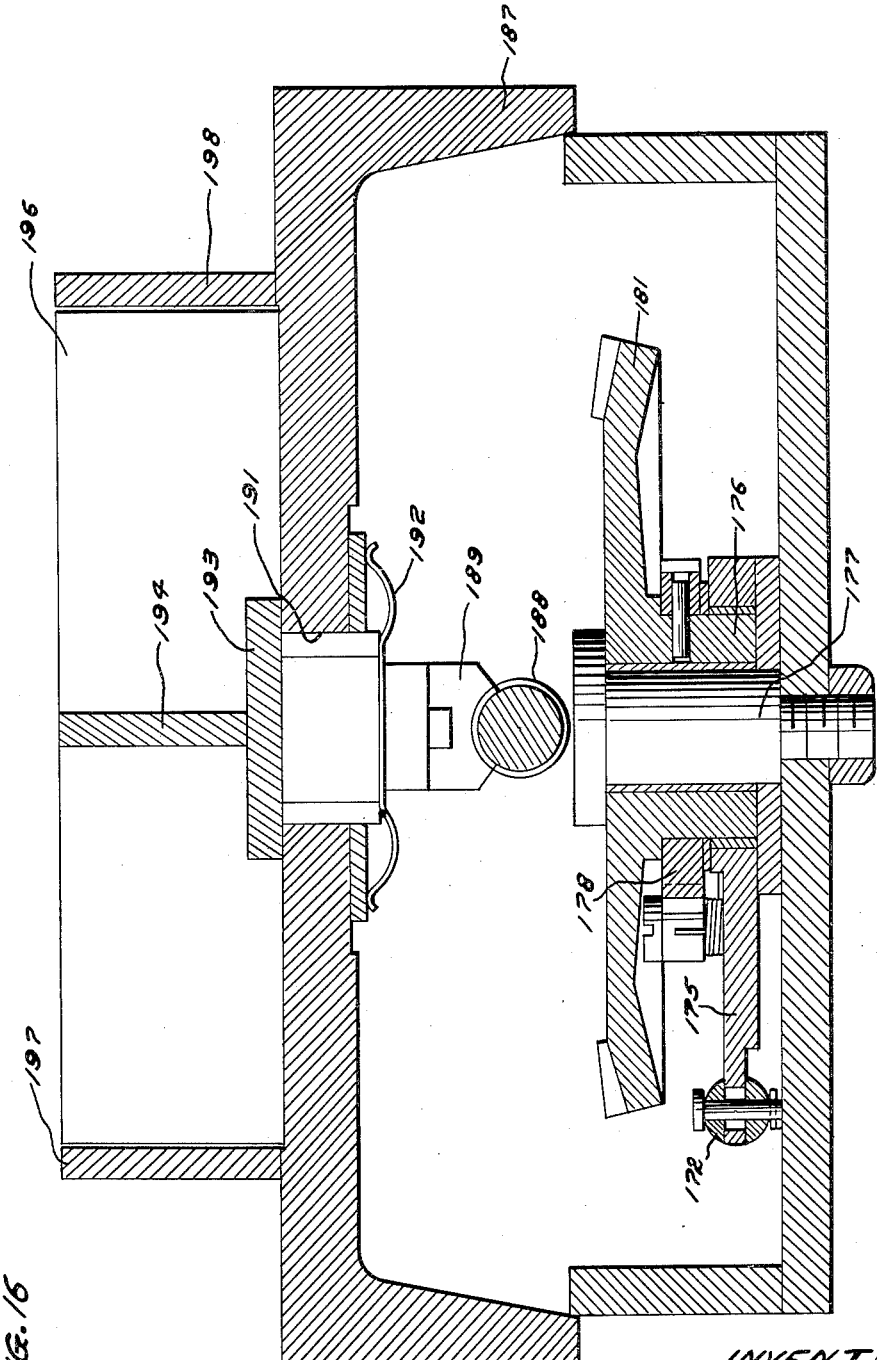

United States Patent Office 3,018,008
Patented Jan. 23, 1962

3,018,008
RACK LOADING MACHINE
Edward F. Eger, Indianapolis, Ind., and Warren O. Simpson, Findlay, Ohio, assignors to Western Electric Company, Incorporated, New York, N.Y., a corporation of New York
Filed Jan. 9, 1957, Ser. No. 633,297
22 Claims. (Cl. 214—6)

This invention relates to apparatus for automatically loading racks and more particularly to apparatus for automatically loading tiers of parts and interposing therebetween spacer elements.

In the manufacture of one type of capacitor, a metallically-coated insulating material is utilized wherein the material is rolled to provide a capacitor of desired capacitance. Thereafter, the capacitors are manually loaded into a rack and each tier of capacitors has a metallic spacer plate placed thereon. The racks are then placed in a hydraulic ram wherein pressure is exerted on the capacitors and each capacitor is changed from a cylindrical shape to a rectangular shape. Obviously where large scale manufacture is contemplated, this fabricating process is very time consuming.

Though the instant invention is described with respect to a machine for automatically loading capacitors and interposing metallic spacer plates between each tier of capacitors, it is to be readily understood that the principles set forth herein may be advantageously employed wherever it is desired to automatically load a great number of parts and interpose a second part between each tier of parts.

It is a primary object of this invention to provide simple and economical devices functioning as a machine for automatically feeding parts into a rack and interposing a member between each group of parts.

Another object of the invention resides in a rack loading machine wherein each group of parts is fed into the rack and arranged in a tier, whereafter instrumentalities are actuated to move a metallic spacer plate onto each tier of parts.

A further object of the invention resides in an automatic rack loading machine having facilities therein for automatically stopping the machine upon completion of the loading operations.

An additional object of the invention is the provision of a novel magnetic pick-up device for advancing a metallic spacer plate from a magazine onto a tier of parts.

A still further object of the invention resides in a magazine-type storage device for maintaining constant the level of spacer plates that are to be picked up by a magnetic transfer device.

With these and other objects in view, the present invention contemplates a machine for accurately loading a rack with tiers of metallized paper capacitors wherein each tier has interposed therebetween a paramagnetic spacer plate. An empty rack is first positioned in the machine and thereupon conditions a circuit for controlling the functional operation of the various machine components. Upon initiation of cyclic operation, automatic guide means are advanced within the rack. Shortly thereafter, feed means are rendered effective to advance a tier of capacitors between the guide means. Simultaneously therewith a magnetic transfer arm advances towards a magazine and picks up a paramagnetic spacer plate. As the transfer arm approaches the stack of plates in the magazine, instrumentalities are actuated to advance the stack a distance equal to the thickness of one plate, thus insuring that the height of the stack remains constant for each engagement therewith by the transfer arm. As soon as the transfer arm picks up a spacer plate the direction of movement of the arm is reversed and the plate is carried towards the rack. The feed and guide means are withdrawn to the initial position as the transfer arm positions the plate on top of the loaded tier of capacitors whereupon a pair of clamps engage and hold the plate in position. Immediately thereupon the directions of movement of the transfer arm is again reversed and a new cycle of operation is initiated.

Other objects and advantages of the present invention will be apparent from the following detailed description when considered in conjunction with the accompanying drawings, wherein FIG. 1 is a side elevational view of a rack loading machine embodying the principal features of the present invention;

FIG. 2 is a side elevational view of a device for holding a rack in position while being loaded with tiers of capacitors separated by paramagnetic plates;

FIG. 3 is a front elevational view of the rack holding device shown in FIG. 2 wherein a portion has been cut away in order to illustrate the construction of certain details;

FIG. 4 is a side view of a mechanism for adjusting hook members utilized in the rack holding device shown in FIG. 2 and 5;

FIG. 5 is a front elevational view of the mechanism illustrated in FIG. 4;

FIG. 6 is a side elevational view showing a device for advancing a tier of capacitors into the rack;

FIG. 7 is a top plan view of the device shown in FIG. 4 having a lid partially cut away;

FIG. 8 is a perspective view of the slide block for advancing capacitors from a chute shown in FIGS. 6 and 7;

FIG. 9 is a side elevational view showing guide facilities for accurately positioning capacitors in a rack and a transfer mechanism for interposing separator plates between each tier of condensers loaded in the rack;

FIG. 10 is a front elevational view of the guide and transfer facilities shown in FIG. 9;

FIG. 11 is a perspective view of the guide mechanism shown in FIGS. 9 and 10 particularly illustrating the configuration of the guide elements;

FIG. 12 is a view partially in section depicting the details of construction of a transfer arm shown generally in FIG. 9;

FIG. 13 is a sectional view taken along line 13—13 of FIG. 9 illustrating the mounting for the transfer arm;

FIG. 14 is a side elevational view depicting a magazine device for advancing spacer plates into position to be engaged by the transfer arm shown in FIGS. 9 and 10;

FIG. 15 is a top plan view of the magazine mechanism shown in FIG. 14;

FIG. 16 is a sectional view taken along lines 16—16 of FIG. 14;

FIG. 17 shows the shape of a condenser that is loaded into a rack;

FIG. 18 shows the shape of an individual condenser after a rack has been completely loaded; and FIG. 19 is a circuit diagram showing the arrangement of electrical components utilized to cyclically operate the rack loading machine.

General description of machine

Figure 1:
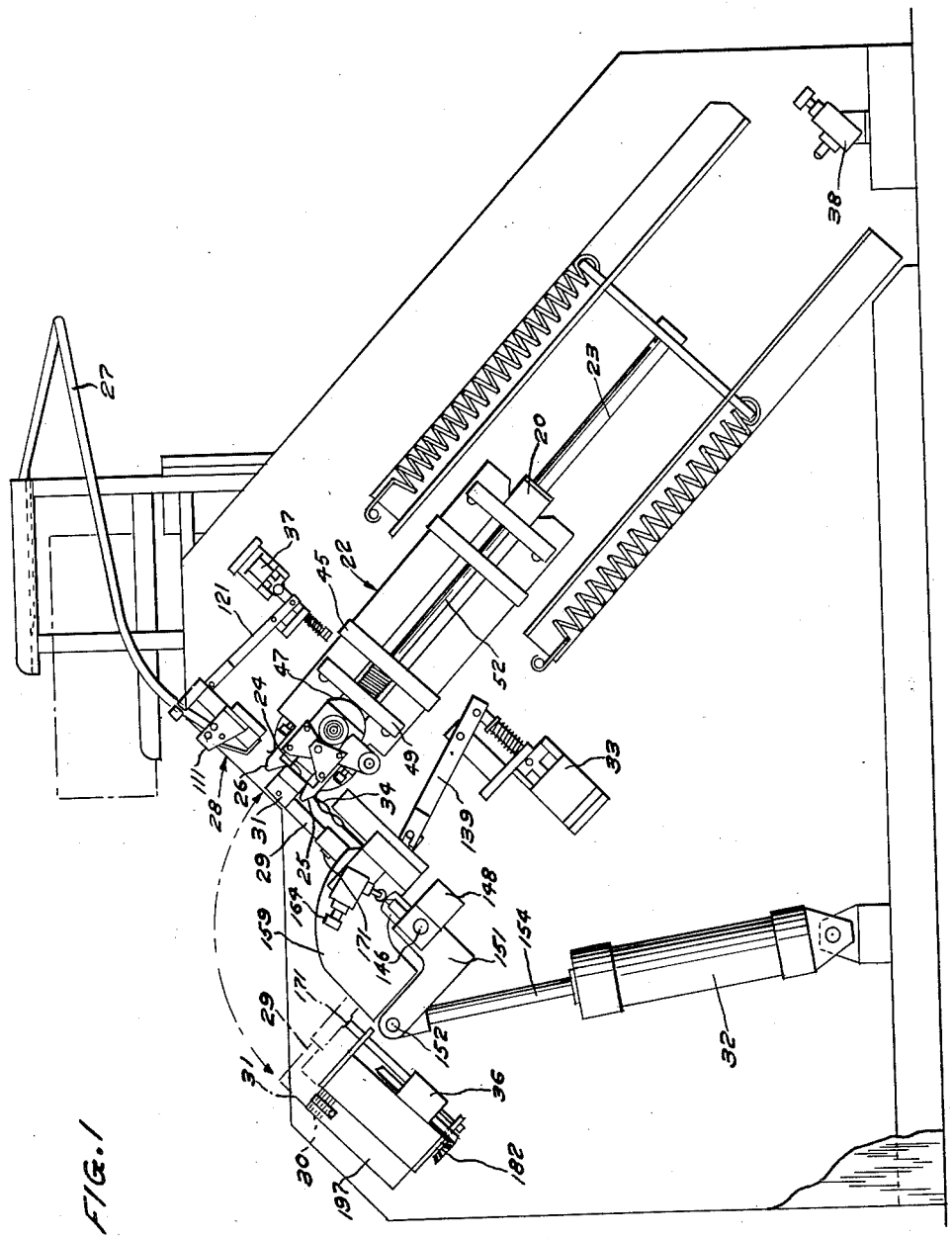

Referring to FIG. 1, a rack 20 to be filled with tiers of capacitors 21 (see FIG. 17) is placed in a rack holder generally depicted by the reference numeral 22. A spring-biased plunger 23 passes through the rack and has placed on the free extremity thereof a rectangular plate 24. A pair of spring-biased hook members 25 and 26 engage and hold the plate in position. An attendant loads capacitors 21 into a series of five gravity feed tubular chutes 27. In the present instance it is contemplated that five of these chutes will be used and the capacitors fed therethrough enter an injector mechanism, generally designated by the reference numeral 28, in groups of five. A transfer arm 29 having a magnetic head 31, is positioned as shown in dotted lines in FIG. 1.

With these preparatory operations completed the attendant will close a start button and a circuit will be energized to actuate a pneumatic or fluid cylinder 32 which will then move the magnetic head 31 towards the position shown in solid lines. The magnetic head 31 is positioned in register with a stack of paramagnetic separator plates 30 and, consequently upon movement of the arm 29 away from the stack, the magnetic head will pick up one plate and advance it toward and beneath the spring-biased hooks 25 and 26 that function to grip and hold the plate in position on the plate 24. As the arm 29 moves to the solid line position, a switch is actuated to reverse the application of pneumatic pressure within the cylinder 32; consequently, the arm 29 will again move towards the dotted line position. This movement is accompanied by the actuation of a further switch to operate a solenoid 33 that functions to advance a number of guide members 34 into position above the spacer or separator plate in the rack 20. Further movement of the arm 29 renders effective a mechanism for causing said arm to rotate 180° and thereby position the head 31 in register with the stack of spacer plates 30. Approach of the arm 29 to the dotted line position is accompanied by the actuation of a plunger actuated magazine feed mechanism 36 that functions to advance the stack of separator plates 30 towards the head 31 so that one plate can be readily engaged by the magnetic head 31.

The approach of the arm 29 towards the magazine 36 is also accompanied by the actuation of a further switch which functions to energize a solenoid 37. Solenoid 37, upon energization thereof, advances the injector mechanism 28 to move five capacitors 21 between the guide wires 34 and onto the spacer plate now positioned beneath the hook members 25 and 26. When the head 31 picks up a plate 30, the circuit is again operated to reverse the pressure in the cylinder 32, and as a result the arm 29 again moves towards the rack 20. This reverse movement is followed by deenergization of the solenoid 37 to withdraw the injector 28 whereupon the guide members 34 will hold the capacitors on the separator plate. When the head 31 advances to engage the separator plate carried thereon with five loaded capacitors, the control circuit is actuated to deenergize the solenoid 33, and as a result thereof the guide members 34 are withdrawn leaving the five capacitors positioned beneath the separator plate 30. Again, as previously discussed, the plate 30 is forced beneath the spring-biased hook members 25 and 26 to firmly hold the capacitors within the rack 20.

Cyclic operation of the machine continues causing tiers of five capacitors separated by plates 30 to be loaded into the rack 20. Upon loading of each tier of capacitors the plunger 23 is moved in a downwardly direction against the action of the spring-biasing means. When the rack has been completely loaded with tiers of capacitors and separator plates, the plunger 23 will engage a switch 38 and the control circuit will be interrupted to permit the attendant to withdraw the loaded rack and insert a new rack in position.

*Rack holder*

The rack holder 22 is shown in FIGS. 2 and 3 and consists generally of two rectangular-shaped holders 39 and 40 made of sheet stock having the long sides thereof bent to form two pairs of oppositely disposed parallel plates 41 and 42 between which the rack 20 is positioned and held by holders 39 and 40. The plates are held in position by guide rollers 43 mounted on studs 44 secured to four cross arms 45 and 46. These cross arms are secured to the frame of the machine and the guide rollers act within slots in the plates 41 and 42 to provide a means for laterally sliding the plates and holders 39 and 40 towards and away from each other to grip and release the rack 20 positioned therebetween.

Cams 47 mounted on a shaft 48 are provided to engage and hold pairs of cross arms 49 and 51 in position. Each cross arm 49 is connected to a cross arm 51 through the instrumentality of a link 52 that passes through apertures 53 and 54 formed in the cross arms 45 and 46, respectively. Interposed between each of the cross arms 45 and 49 is a compression spring 56 tending to move the cross arm 49, and as a consequence, the cross arm 51 in an upwardly direction. Rotatably mounted in the extremities of the cross arms 49 and 51 are a number of bearing rollers 57. Each bearing roller 57 is positioned within an inclined slot 58 formed in one of the slide plates 40 or 41.

The shaft 48 is provided with a gear 59 meshing with a gear segment 61 adapted to be actuated by a handle 62. This mechanism enables the attendant to move low portions of the cams 47 in register with the cross arms 49. Upon presentment of the low portion of the cams 47 to the cross arms 49, the springs 56 will move the cross arms 49 and 51 in upwardly direction causing the bearing rollers 57 mounted thereon to move within the slots 58 to thereby exert camming forces on the edge surfaces forming the slots to move the plates 41 and 42 and hence the holders 39 and 40 away from each other and thereby release the rack 20.

The hook members 25 and 26 are mounted pivotally about rods 63 and 64 having eccentric stud shafts 66 and 67 formed at the extremities thereof (see FIGS. 3, 4 and 5). These hook members are spring urged towards each other by tension leaf springs 68 and 69 to grip the rectangular plate 24 or a spacer plate 30 beneath the laterally extending hooks. Movement of the hook members 25 and 26 toward each other is limited by a pair of rods 71 and 72 (FIGS. 2 and 3) mounted within plates 73 and 74 that are in turn pivotally mounted about shafts 75 and 76 fixed to the frame of the machine. Fixed near the extremities of the plates 73 and 74 and extending therefrom are short rods 78 adapted to set within slots 79 formed in the extremities of the plates 74. Rods 78 are also maintained in position through the agency of the cams 47. When the attendant operates the handle 61 to move the cams 47, the rods 78 move onto a high portion of the cam, and as a result will impart a pivotal movement to the plates 73 and 74. Pivotal movement of the plates 73 and 74 causes the rods 71 and 72 to engage and move the hook members 25 and 26 away from each other. This operation permits the attendant to withdraw a loaded rack from the holder and insert an empty rack in place thereof.

It will be noted that a full rack is urged upwardly and out of the rack holder by the spring-biased plunger 23 (FIG. 1) acting on the plate 24; thus, it may be appreciated that upon release of the hook members 25 and 26, the removal of the rack will be considerably enhanced by the now extended springs acting on plunger 23.

In order to adjust the position of the hook members 25 and 26 so that capacitors of different diameter or spacer plates of different thickness may be utilized, rotatably adjustable mounts are provided for the stud shafts 66 and 67. Each end of the eccentric shafts 66 and 67 is rotatably mounted within an L-shaped bracket 80 (see FIGS. 4 and 5) that is attached to the frame of the machine. A link 81 is pinned to the stud shaft 66 and provided with an elongated slot into which is positioned a pin 83. This pin is secured within apertures formed in a slide yoke 84 rotatably connected to an adjusting screw 85 by means of a pin 86 acting within a circumferential groove formed in the lower unthreaded section of this screw. The screw is mounted within a threaded aperture machined in the horizontal arm of the bracket 80, and the upper extremity of the screw is provided with a knurled head 87 that will enable an attendant to turn the screw, and as a consequence, move the slide yoke 84 upwardly or downwardly, thus pivoting the link 81 and the stud shafts 66 and 67. Inasmuch as the pivot rods 63 and 64 are eccentrically located with respect to the respective stud shafts 66 and 67, the hook members 25 and 26 are moved upwardly or downwardly upon turning of the knurled heads 87.

*Capacitor injector mechanism*

Attention is now directed to FIGS. 6, 7 and 8, wherein the details of the capacitor injector mechanism 23 are shown. Capacitors to be loaded into the rack 20 are gravity fed down the five chutes 27 into cutaway sections 100 formed at the terminus of each chute 27, where the capacitors pass beneath and are held by an irregular shaped plate 101. Each section 100 of each chute 27 terminates in a slot 102 formed in a slide block 103 that is mounted in guideways formed in a pair of guide blocks 104—105.

Slide block 103 is provided with a slot 107 into which a lever 108 is positioned. The upper terminus of lever 108 is fixed to a pivot rod 109 rotatably mounted within frame extensions 111 and 112. Also mounted within the frame extensions is a spring-biased pivot rod 113 having welded thereto the plate 101. The spring bias exerted on the rod 113 tends to rotate the plate 101 in a clockwise direction but is retained from such movement by a fin 114 laterally extending from pivot rod 109. Rod 109 has a second fin 116 laterally extending therefrom in a direction diametrically opposed to the fin 114, and the terminus thereof engages a retaining lid 117 secured to a pivot rod 118 mounted within the frame extensions 111 and 112. A relatively strong spring exerts a force on the rod 118 to urge the lid 117 in a counterclockwise direction. The lower terminus of the lid overlaps the end of the slide block 103 and thus holds the capacitors within the slots 102.

Looking at FIG. 8, it will be noted that the slots 102 are enlarged in those sections positioned beneath the extensions 100 of the chutes 27. It will be further noted that the lefthand end of the slide block 103 is beveled. The purpose of this construction is to permit guide members 34 to ride over the upper face of the slide block 103 and fall within the enlarged sections of the slots 102 to grip the condensers positioned within the narrow portions of the slots 102.

In order to actuate the injector mechanism it will be recalled that the solenoid 37 is energized, whereupon its armature is drawn up to pivot a lever 121 in a counterclockwise direction. Lever 121 has a yoke 122 attached thereto. This yoke is provided with slots 123 to accommodate therein pins 124 extending from an abutment 126 projecting from the lower face of the slide 103. As counterclockwise movement is imparted to the lever 121 the slide 103 will be advanced towards the left and the right wall of the slot 107 will engage the lever 108, causing said lever to pivot in a clockwise direction. Movement of lever 108 causes the fin 116 to act against the lid 117 and as a result the lower tip of the lid is moved from register with the slide block 103. Simultaneously therewith the fin 114 engages and moves the plate 101 in a counterclockwise direction, thereby moving the lower extremity thereof into engagement with each capacitor positioned within a cutaway section 100 of the gravity chute 27. It may be readily understood that the action of the plate 101 holds the stack of capacitors within the chutes 27 so that only one group of five capacitors is advanced with each movement of the slide block 103.

Upon deenergization of the solenoid 37, a spring 127 acts to restore the injector mechanism to the initial position shown in FIGS. 6 and 7. The plate 101 releases the stacks of capacitors and a new row of five capacitors is passed through the slots 102 and are retained by the lower section of the lid 117. Dimensions are selected for the actuating linkage to cause the block 103 to advance the condensers contained therein in register with the plate 24 positioned within the rack 20.

*Capacitor guide and holding mechanism*

Referring to FIGS. 9, 10 and 11, facilities are shown for advancing the plurality of guide members 34 into position to accurately arrange and hold the capacitors within the rack 20. Each guide member 34 is formed of music wire in an undulating configuration with a flared extremity. The guide members 34 are secured to a holding plate 130 and are spaced apart a distance slightly greater than the diameter of the capacitors. Plate 130 is secured to a projecting member 131 fixed to a slide 132. This slide is positioned within slots formed in a pair of guide blocks 133 and 134 which in turn are secured to the frame of the machine. Projecting from the underside of the slide 132 are abutments 136 having stud shafts 137 extending therefrom. Pivotally mounted on the stud shafts 137 are the arms of a yoke 138 that are welded to a pivotally mounted arm 139. Arm 139 is pivoted in a clockwise direction through the agency of the solenoid 33 and is restored to the position shown in FIG. 9 by a compression spring 140 when the solenoid is deenergized.

It will be recalled that the solenoid 33 is energized after a spacer plate has been inserted in the rack 20. When the capacitor injector mechanism 28 is actuated to advance a group of five capacitors toward the rack 20, the beveled edges of the slide 103 will cam the guide wires 34 upwardly until the flared sections thereof are in register with the enlarged portion of the slots 102 whereupon the wires move downwardly to engage each capacitor between the undulating sections of the wires. As the slide 103 is withdrawn from the rack 20, the flared sections of the guide wires will be cammed inwardly to grip the capacitor between the undulating sections, and thereby hold each capacitor on the separator plate 30. When another separator plate has been advanced to engage and hold the capacitors and the solenoid 33 is deenergized, then the wires 34 may be withdrawn without disturbing the capacitors.

*Separator plate transfer mechanism*

Attention is directed to FIGS. 9, 10, 12 and 13 wherein there is shown the mechanism for effectuating a transfer of the separator plates 30 from the magazine 36 into the rack 20. The magnetic head 31 consists of a plurality of permanent magnets 141 mounted within a block 142 secured to transfer arm 29. This arm is cylindrical in shape and is rotatably mounted within a sleeve 143 secured to a block 144. Extending laterally from both sides of the block 144 are pivot shafts 146 and 147 having the respective ends thereof pivotally mounted within support brackets 148 and 149. Block 144 has secured to each side face thereof an L-shaped plate 151. A shaft 152 is mounted between the upper extremities of the plates 151 and has mounted thereon a clevis 153. Secured to this clevis is a piston rod 154 (see FIG. 1) adapted to be actuated by the pneumatic pressure cylinder 32.

Arm 29 is provided with a spiral slot 155, as shown in FIG. 12, into which an operating pin 156 is positioned. Sleeve 143 is provided with elongated slots 157 to accommodate the pin 156 for axial movement. Pin 156 also passes through slots 158 that are formed in a pair of plates 159 secured to the frame of the machine. There will be noted from an inspection of FIG. 9 that the slots 158 gradually approach the axis of rotation of the pivot shaft extension 146.

When the piston rod 154 is actuated to effectuate a pivoting of plates 151, and as a consequence the block 144, the arm 29 and the sleeve 143 is caused to pivot in a counterclockwise direction. Upon movement of the arm 29 the pin 156 will ride within the slots 158 and move towards the center of rotation of the block 144.

As pin 156 executes this movement it will move along the spiral groove 155 formed in the arm 29 to exert a force thereon that functions to rotate the arm and head 31 180° by the time that the pin 156 reaches the upper extremity of the slots 158. In this position the magnets 141 will be rotated 180° and be in register with the separator plates 30 so that a plate 30 may be picked up and moved to rack 20 upon return movement of the head 31. Obviously during this return movement the arm 29 will be rotated 180° to position the separator plate 30 in register with the condensers loaded in the rack 20.

Mounted on the lefthand pivot shaft extension 146 is a cam 161 adapted to actuate a switch 162. This switch is normally biased to a closed position to control the energization of the capacitor guide solenoid 33 and when actuated by the cam the switch is opened to disrupt the energized circuit to effectuate a withdrawal of the guide members 34 from engagement with the condensers in the rack 20. When the cam 161 moves from engagement with the switch 162 the solenoid 33 will be energized to move the guide members into position to perform their designated functions. Also mounted on the pivot shaft extension 146 is a spring-biased trip 163 adapted to control the actuation of a switch 164. When the arm 29 moves in a counterclockwise direction the trip 163 will merely ride over the actuating mechanism of the switch 164. However, upon clockwise movement being imparted to the arm 29 the trip 163 will actuate the switch 164 to energize a control circuit for the pneumatic pressure cylinder 32 so that the direction of pneumatic pressure therein is reversed and the direction of movement of the separator plate feed mechanism is also reversed.

Pivot shaft extension 147 has mounted thereon a cam 166 very similar in shape to cam 161. This cam is adapted to actuate a switch 167 when the arm 29 is moved in the counterclockwise direction. Switch 167 completes the energizing circuit for the solenoid 37, which will be recalled as being the actuating means for the condenser feed mechanism 28. Pivot shaft extension 147 also carries a trip device 168 that functions to actuate a switch 169 included in the control circuit for the pressure cylinder 32. Closure of switch 169 again reverses the direction of the fluid within the cylinder 32 to effectuate a reversal of the movement of the arm 29 and said arm will move towards the rack 20 carrying a separator plate 30 thereto.

*Separator plate magazine*

Referring to FIGS. 14, 15 and 16 there is disclosed the components of a magazine for advancing a stack of the separator plates 30 into position to be picked up by the magnetic head 31. As the head 31 approaches the stack of plates 30, an arm 171 attached to the sleeve 143 (see FIGS. 9 and 10) engages a spring-biased plunger 172 slidably mounted within bearing supports 173 and 174. Pivotally secured to the inner extremity of the plunger 172 is a plate 175 rotatably mounted on a hub 176 which is in turn rotatably mounted on a shaft 177. This shaft is fixed in the frame for the magazine. The hub 176 has fixedly mounted thereon a ratchet 178 adapted to be actuated by a spring-biased pawl 179 mounted on plate 175.

Ratchet 178 is attached through hub 176 to the underface of a bevel gear 181 meshing with a bevel pinion 182 keyed to a shaft 183. This shaft is rotatably mounted within bearings 184 and 186 mounted within a housing 187 for the magazine feed mechanism. Helical screw threads 188 are formed on shaft 183 to engage and advance a slide block 189 that extends up through a slot 191 formed in the upper side of the housing 187. Looking at FIG. 16 it will be noted that leaf springs 192 are provided to urge screw threads formed on the underside of the block 189 into engagement with the threads 188. Secured to the upper surface of the block 189 is a plate 193 extending over the edges of the slot 191. Attached to the upper face of the plate 193 is a bracket 194 having secured thereto a pusher member 196. This pusher member is adapted to slide between walls 197 and 198 of the housing 187 and has positioned thereon the stack of separator plates 30.

In operation of the spacer plate magazine the actuation of the plunger 172 causes the pawl 179 to advance the ratchet 178 one increment and as a result gears 181 and 182 are turned a sufficient distance to impart a rotation to the shaft 183. This action causes the slide block 189 to advance towards the right, as viewed in FIGS. 14 and 15, and the stack of separator plates 30 is moved a distance equal to the thickness of one spacer plate. It will be thus appreciated that upon each advancement of the head 31 toward the magazine the stack of plates are advanced an amount such as to maintain the upper level thereof constant. Leaf springs 199 attached to walls 197 and 198 hold the plates within the magazine until withdrawn by the movement of the magnets 141 away from the magazine.

*Control circuit*

The circuit illustrated in FIG. 19 controls the operation of the various mechanisms, hence a summary of the operation of the rack loading apparatus may be had by referring to FIG. 19 in conjunction with FIG. 1. Insertion of a rack 20 in the rack holder 22 effectuates a closure of the switch 38 to condition a relay 201 for operation. Assume that the arm 29 is in the dotted line position as shown in FIG. 1 and the rectangular plate 24 has been moved beneath the hook members 25 and 26, then depression of a start button 202 will complete a circuit through upper contacts 169, now closed by trip 168, to a relay 203. Energization of relay 203 draws up a contact 204 to complete a circuit for a solenoid 206 that functions to reverse the direction of fluid in the cylinder 32 causing the piston rod 154 to move upwardly and move the arm 29 and magnetic head 31 carrying a plate 30 thereon toward the rack 20. As soon as the transfer arm 29 starts to move, an automatic cycle switch 207 is closed by the attendant. As the magnetic head 31 deposits a plate 30 on the rack 20, the switch 164 is actuated to again operate the relay 203 which functions to again energize the relay 203 and the contact 204 is drawn up to again complete the circuit to the solenoid 206. Transfer arm 29 and head 31 now start to move toward the magazine 36 and the switch 162 is closed to energize the solenoid 33. This results in the advance of the guide wires 34 into position above spacer plate 30 inserted in the rack. As the arm 29 approaches the magazine 36, the normally open switch 167 is closed to complete a circuit for the solenoid 37. Solenoid 37 thereupon operates the injector mechanism to advance five capacitors between the guide wires 34 and onto the spacer plate 30 positioned beneath the hook members 25 and 26.

Upon the magnetic head 31 picking up another plate 30, the direction of movement of the magnetic head is reversed and as it advances toward the rack, the switch 167 is opened to deenergize the solenoid 37. Immediately thereafter the injector mechanism is withdrawn to leave five capacitors deposited on the plate 30 between the guide wires 34. Engagement of the plate carried by the head 31 with the deposited capacitors is accompanied by the opening of the switch 162 that deenergizes the solenoid 33 to effectuate a withdrawal of the guide wires 34. The apparatus will continue to function until the rack 20 is filled with tiers of capacitors interspaced with plates 30.

When the start button 202 is depressed, the conditioned circuit for the relay 201 is completed whereupon the relay draws up a contact 208 to complete a shunt circuit around the start button. The apparatus will continue to cyclically function until such time that the rack 20 is fully loaded, whereupon the plunger 23 is moved down to actuate the switch 38. Relay 201 thereupon deenergizes to release the contact 208, and the source of power for operating the control circuit is interrupted.

Switch 207 is opened and the start button 202 is again depressed to effectuate withdrawal of the transfer arm 29 the head 31 to the dotted line position. The attendant then will operate handle 62 (FIG. 3) to release the hook members 25 and 26 and open the rack holder 22. Simultaneously therewith, the spring-biased plunger 23 will exert a force on the loaded rack 20 to enable the attendant to easily withdraw the rack from the holder. The condensers in the fully loaded rack will be compressed and assume the shape shown in FIG. 18.

It is to be understood that the above-described arrangements of apparatus and construction of elemental parts are simply illustrative of an application of the principles of the invention and many other modifications may be made without departing from the invention.

What is claimed is:

1. An apparatus for loading parts into a rack, means for cyclically advancing groups of parts to the rack, a magazine of spacer members, means for cyclically advancing spacer members from said magazine onto a group of parts positioned within the rack to hold each group of parts in the rack, and means for cyclically advancing a guiding member to the rack for holding the parts on the rack after retraction of the parts advancement means and before application of the spacer member.

2. An apparatus for loading tiers of parts in a rack, a magazine for storing elements, a means for holding the rack, means for cyclically advancing elements from said magazine to said rack, means for yieldably holding said elements in said rack and movable by engagement with said elements, means actuated by said cyclically advancing means for moving a tier of parts onto each element held in the rack, and means actuated by said cyclically advancing means for guiding and holding each tier of parts on the element held in the rack until the advancement of the next element.

3. A rack loading apparatus comprising means for holding a rack, a slide having a plurality of slots therein, means for advancing parts into the slots, a plurality of pairs of resilient gripping members, means for advancing the gripping members into register with the rack, said slide having cam surfaces thereon for engaging and forcing said resilient members into engagement with said parts, and means for advancing said slide toward and away from said gripping members whereby said cam surfaces move said gripping members into position to engage and hold said parts in the rack.

4. In an apparatus for loading tiers of parts in a receiving device, a slide having a plurality of slots therein for receiving a tier of parts, means for advancing a tier of parts into said slots, said slide having bevel surfaces on the forward end thereof and outwardly flaring cam surfaces on the rear extremities of said slots, a plurality of resilient guide members having flared extremities, means for cyclically advancing the guide members toward and from register with said receiving device, and means for cyclically moving said slide toward and from said receiving device while said guide members are positioned in register with said receiving device whereby said bevel surfaces move the guide members to permit the flared extremities thereof to drop behind the cam surfaces and said cam surfaces act on the flared extremities to cause the members to grip the parts.

5. In an apparatus for loading a rack with tiers of parts having spacer elements interposed between each parts, a rack for sequentially receiving tiers of parts and spacer elements, a magazine having a slidable pusher member for supporting a stack of spacer elements, a transfer member for cyclically advancing spacer elements to said rack, means operated by said transfer member for moving the pusher member to maintain the height of the stack of spacer elements, yieldably mounted members for holding the spacer elements in said rack and movable upon engagement with said spacer elements, means for cyclically feeding tiers of parts to said rack, means for cyclically positioning the parts on said spacer elements during the advancements of spacer elements, and means operated by the transfer means for cyclically operating the feeding means and positioning means.

6. In an apparatus for loading a rack with tiers of parts having spacer elements interposed between each tier, a pair of spaced plates, means for moving said plates toward each other to retain a rack therebetween, a magazine of spacer elements, a transfer member for cyclically advancing spacer elements from said magazine to said rack, a pair of resiliently biased hook members for retaining the spaced elements in the rack, said hook members having camming surfaces for separating the members upon engagement with an advancing spacer element, a slidable feeding member having a plurality of grooves therein for receiving a tier of parts, means actuated by the transfer member for cyclically moving said feeding member to the rack, and guiding means for holding each tier of parts in the rack during advancement of each spacer element.

7. An apparatus for loading a rack with tiers of parts having spacer elements interposed between each tier, comprising a rack having a slidable bottom plate for supporting the elements and parts, a rack holder having a pair of spaced plates, means for moving said plates toward each other to maintain a rack therebetween, means on said rack holder for urging the bottom plate toward the top of the rack, a magazine having a slidable pusher member for supporting a stack of spacer elements, a transfer means for cyclically advancing the spacer elements to said rack, a pair of hook members for retaining the spacer elements in the rack, said hook members having camming surfaces for separation thereof upon engagement with each advanced spacer element, means actuated by said transfer member for moving the pusher member to maintain the height of a stack of spacer elements, a feeding member having a plurality of grooves therein for receiving tiers of parts, means actuated by the transfer member for cyclically advancing said feeding member to the rack after the advancement of each spacer element, and guiding means for holding a tier of parts on a spacer element during the advancement of the next successive spacer element.

8. In an apparatus for transferring articles to a rack, a pair of spaced members, means for moving said spaced members toward each other to retain a rack therebetween, a source of articles, a pair of spaced guide plates extending between the source and the rack and each having a substantially arcuate shaped slot of increasing radius of curvature, a sleeve mounted for pivotal movement between the guide plates, a transfer means having a helical slot therein and rotatably mounted in said sleeve for moving the articles from a source to said rack, a pin extending through said arcuate and helical slots, and means for pivoting said sleeve thereby guiding the pin along the arcuate slots causing the pin to traverse the helical slot to rotate said transfer means.

9. In an apparatus for transferring articles to a rack, a rack having a slidable bottom plate for supporting the articles, a rack holder having a pair of spaced members, means for moving said spaced members toward each other to retain a rack therebetween, means on said rack holder for urging the bottom plate toward the top of the rack, a source of articles, a pair of spaced guiding plates extending between the source and said rack and each having a substantially arcuate shaped slot of increasing radius of curavture, a sleeve mounted for pivotal movement between the guide plates, a transfer means having a helical slot therein and rotatably mounted in said sleeve for moving the articles from the source to the rack, a pin extending through said arcuate and helical slots, means for pivoting said sleeve whereby the pin is guided along the arcuate slots and traverses the helical slot to rotate the transfer means, and hook members pivotally mounted on said rack holder for securing the articles in the rack against the force of the bottom plate, said hook members having camming surfaces thereon for separating the members upon engagement with an article being advanced toward the rack.

10. An apparatus for transferring parts from a source to a receiving means, a pair of spaced plates each having a substantially arcuate shaped slot of increasing radius of curvature, a sleeve mounted for pivotal movement between said plates, a transfer member having a helical slot therein and rotatably mounted in said sleeve for moving the parts from the source to the receiving means, a pin extending through said arcuate and helical slots, and means for pivoting said sleeve thereby guiding the pin along the arcuate slots and traversing the helical slot to rotate said transfer member.

11. An apparatus for transferring articles to a rack, comprising a rack having a slidable bottom plate for supporting the articles, a rack holder having a pair of spaced members, means for moving said spaced members toward each other to retain a rack therebetween, means on said rack holder for urging the bottom plate toward the top of the rack, a support means having a movable pusher member for a stack of articles, guide means for said pusher member having a threaded section, a screw cooperable with said threaded section to advance the guide means and the pusher member, a pair of spaced guide plates extending between the source and said rack and each having a substantially arcuate shaped slot of increasing radius of curvature, a sleeve mounted for pivotal movement between the guide plates, a transfer member having a helical slot therein and rotatably mounted in said sleeve for moving the articles from the stack to the rack, a pin extending through said arcuate and helical slots, means for pivoting said sleeve whereby the pin is guided along the arcuate slots and traverses the helical slot to rotate the transfer member, hook members for securing the articles in the rack against the force of the bottom plate, said hook members having camming surfaces thereon for separating the members upon engagement with an article being advanced toward the rack, and means actuated by said sleeve for turning said screw to advance the pusher member to maintain the height of the stack of articles.

12. An apparatus for unloading articles from a magazine, comprising a magazine for a stack of articles, a movable pusher member for supporting the stack, guide means for said pusher member having a threaded section, a screw cooperable with said threaded section to advance the guide means and the pusher member, a pair of spaced guide plates extending between the stack of articles and a receiving point for said articles and each having a substantially arcuate shaped slot of increasing radius of curvature, a sleeve mounted for pivotal movement between the guide plates, a transfer member having a helical slot therein and rotatably mounted in said sleeve for cyclically unloading the articles from the stack to the receiving point, a pin extending through said arcuate and helical slots, means for pivoting said sleeve whereby the pin is guided along the arcuate slots and traverses the helical slot to rotate the transfer member, and means actuated by the sleeve for turning said screw to advance the pusher member to maintain the height of the stack of articles.

13. In an apparatus for delivering tiers of articles to a discharge station, a frame, a slide movable in said frame between a receiving and a discharge station and having a plurality of longitudinal grooves therein, a chute extending into each groove for advancing a tier of articles to said slides, a lid pivotally mounted to the frame and extending over the front of the slide for preventing the discharge of articles from said grooves, a holding member pivotally mounted to said frame and engageable with the second tier of articles positioned in the extremities of the chutes, means for moving the slide to the discharge station, and means operated by the movement of the slide to the discharge station for moving the lid from the path of the tiers of articles in the grooves and moving the holding member against the second tier of articles in the extremities of the chutes to prevent entrance of the second tier into the grooves.

14. In an apparatus for loading tiers of parts into a rack, means for holding said rack, a magazine device for storing separator plates, means for cyclically advancing separator plates from the magazine to the rack, means for advancing a tier of parts to said rack after the advancement of each separator plate, means for retaining said separator plates in the rack, a spring-biased bottom plate urged towards the top of the rack for forcing the parts and plates against the retaining means, and means for holding each tier of parts on a separator plate until advancement of the next successive separator plate.

15. Apparatus for alternately loading first parts and second parts into a receiving device which comprises, a transfer member mounted for movement about two substantially perpendicular axes for cyclically advancing the first parts from a first source to said receiving device, means for holding said first parts in said receiving device, carriage means for cyclically advancing the second parts from a second source onto said first parts, a plurality of spaced guide members, drive means for cyclically advancing said guide members to the receiving device, and cam means on said carriage means for moving said guide members into clamping engagement with the second parts so that said guide members remove the second parts from said carriage means upon the retraction of said carriage means, said guide members acting to retain the second parts in the receiving device during the period between the retraction of said carriage means and the application of the first parts.

16. In a machine for loading articles into a rack having a substantially open article receiving end, the combination which comprises, a holder for the rack, said holder including a pair of spaced movable plates, movable cam means engageable with cam surfaces on said plates for moving said plates toward each other to grip a rack therebetween, an article supporting member disposed in the rack, and means on said holder resiliently biasing said article supporting member toward the article receiving end of the rack, means for transferring articles from a source of supply into the rack against the action of said article supporting member, retaining members movably mounted on said holder and resiliently biased toward a normal position wherein they extend over the article receiving end of the rack for retaining the articles in the rack against the action of said article supporting member during a loading operation, and means for facilitating movement of said resiliently biased members away from their normal position when an article is advanced toward the rack to allow movement of the article into the rack, said resiliently biased members moving back to their normal position after the article has entered the rack to strip the article from said transfer means as it moves away from the rack.

17. In apparatus for loading articles into a container having a substantially open article receiving end, the combination which comprises, a holder for said container, an article supporting member disposed in the container and resiliently urged toward the article receiving end of the container, substantially arcuate shaped cam means adjacent a source of articles and said holder having an increasing radius of curvature, a pivoted member adjacent said cam means having elongated slot means formed therein, an article transfer member having helical slot means formed therein and mounted on said pivoted member for rotation about an axis extending substantially perpendicular to the pivotal axis of said pivoted member, pin means engaged with said cam means and extending through said elongated slot means and said helical slot means, and means for oscillating said pivoted member about the pivotal axis thereof, whereby said pin means traverses said cam means, said elongated slot means and said helical slot means to rotate said article transfer member, and whereby said article transfer member moves between the source of articles and a position wherein it moves an article into the article receiving end of the container against the action of said article supporting member, members movably mounted on said holder so as to have a normal position wherein they extend over the article receiving end of the container for retaining the articles in the container against the action of said article supporting member during a loading operation, means for facilitating movement of said members away from their normal position when an article is advanced toward the container to allow movement of the article into the container, and means for moving said members back to their normal position after the article has entered the container, to strip the article from the transfer member as it moves away from the container.

18. In a machine for loading articles into a rack having a substantially open article receiving end and including transfer means for moving the articles into the rack, the combination which comprises, a rack holder including a pair of spaced plates connected together for movement toward and away from each other, spring biased movable cam means engageable with cam surfaces on said plates for moving said plates toward each other to grip a rack therebetween, an article supporting member disposed in the rack, and spring means on said holder resiliently biasing said article supporting member upwardly toward the article receiving end of the rack, spring biased hook-like members pivotally mounted on said holder and having a normal position wherein portions thereof extend over the article receiving end of the rack for retaining articles in the rack against the action of said resiliently biased article supporting member during a loading operation, cam surfaces on said portions of said hook-like members engageable by an article as it is advanced toward the rack, for moving said hook-like members away from their normal position to allow movement of the article into the rack, said hook-like members moving back to their normal position after an article has entered the rack to strip the article from said transfer member as it moves away from the rack, and means for moving said movable cam means and said hook-like members simultaneously to release the rack when a loading operation is completed.

19. Apparatus for loading articles on a rack having a substantially open article receiving end which comprises, a rack holder, a magazine having a slidable pusher member for supporting a stack of articles, an article supporting member disposed in the rack and resiliently biased toward the article receiving end of the rack, substantially arcuate shaped cam means adjacent the magazine and said rack holder having an increasing radius of curvature, a pivoted member adjacent said cam means having elongated slot means formed therein, an article transfer member having helical slot means formed therein and mounted on said pivoted member for rotation about an axis extending substantially perpendicular to the pivotal axis of said pivoted member, pin means engaged with said cam means and extending through said elongated slot means and said helical slot means, and means for oscillating said pivoted member about the pivotal axis thereof, whereby said pin means traverses said cam means, said elongated slot means and said helical slot means to rotate said article transfer member, and whereby said article transfer member moves between the stack of articles and the rack for transferring articles into the article receiving end of the rack against the action of said article supporting member, members movably mounted on said holder so as to have a normal position wherein they extend over the article receiving end of the rack for retaining the articles in the rack against the action of said article supporting member during a loading operation, means for facilitating movement of said members away from their normal position when an article is advanced toward the rack to allow movement of the article into the rack, means for moving said members back to their normal position after the article has entered the rack to strip the article from said transfer member as it moves away from the rack, and means operated by the movement of said transfer member to maintain the height of the articles in said magazine constant.

20. Apparatus for loading articles on a rack having a substantially open article receiving end which comprises, a rack holder having a pair of spaced plates movable toward each other to grip the rack therebetween, a magazine having a slidable pusher member for supporting a stack of articles, an article supporting member disposed in the rack and resiliently biased toward the article receiving end of the rack, a transfer member mounted for movement about two substantially perpendicular axes between the stack of articles and a position wherein it transfers articles into the article receiving end of the rack against the action of said article supporting member, resiliently biased members movably mounted on said plates so as to have a normal position wherein portions thereof extend over the article receiving end of the rack for retaining the articles in the rack against the action of said article supporting member during a loading operation, cam surfaces on said portions of said resiliently biased members engageable with an article as the article is advanced toward the rack for moving said resiliently biased members away from their normal position to allow movement of the article into the rack, said resiliently biased members moving back to their normal position after the article has entered the rack to strip the article from said transfer member as it moves away from the rack, means operated by the movement of said transfer member to maintain the height of the articles in said magazine constant, and means for simultaneously moving said spaced plates away from each other and said resiliently biased members away from their normal position to release the rack when the loading operation is completed.

21. In apparatus for loading paramagnetic articles into a container having a substantially open article receiving end, the combination which comprises, a holder for said container, an article supporting member disposed in the container and resiliently urged toward the article receiving end of the container, substantially arcuate shaped cam means adjacent a source of articles and said holder having an increasing radius of curvature, a pivoted member adjacent said cam means having elongated slot means formed therein, an article transfer member having helical slot means formed therein and mounted on said pivoted member for rotation about an axis extending substantially perpendicular to the pivotal axis of said pivoted member, a magnet on said article transfer member, pin means engaged with said cam means and extending through said elongated slot means and said helical slot means, and means for oscillating said pivoted member about the pivotal axis thereof, whereby said pin means traverses said cam means, said elongated slot means and said helical slot means to rotate said article transfer member, and whereby said article transfer member moves said magnet to the source of articles and moves an article carried on said magnet into the article receiving end of the container against the action of said resiliently biased article supporting member, resiliently biased members movably mounted on said holder so as to have a normal position wherein portions thereof extend over the article receiving end of the container for retaining the articles in the container against the action of said resiliently biased article supporting member during a loading operation, and cam surfaces on said portions of said resiliently biased members engageable with an article as the article is advanced toward said container, whereby said resiliently biased members move away from their normal position to allow movement of the article into the container, and then move back to their normal position to strip the article from said magnet as said magnet is moved away from the container by said transfer member.

22. In apparatus for loading parts into a receiving device, the improvement which comprises, a pair of opposed supports movable into juxtaposition with one another, means on one of said supports for holding a part, a plurality of resilient members projecting from the other of said supports toward said one support and having laterally extending portions on the outer extremities thereof, cam means for moving said resilient members in a first direction as said supports are brought into juxtaposition with one another to allow the laterally extending portions on said resilient members to move toward and beyond an adjacent portion of a part on said one support, said resilient members being permitted to move in a direction opposite to said first direction and substantially into engagement with the part on said one support when said supports are substantially in juxtaposition with one another, and cam means for moving said resilient members in a direction substantially at right angles to said first direction as said supports move away from one another, to move said resilient members into clamping engagement with the part whereby said resilient members remove the part from said one support into the receiving device.

References Cited in the file of this patent
UNITED STATES PATENTS

| | | |
|---|---|---|
| 1,490,594 | De Lateur | Apr. 15, 1924 |
| 1,552,648 | Rosenthal et al. | Sept. 8, 1925 |
| 1,717,695 | La Bombard et al. | June 18, 1929 |
| 1,818,592 | Walworth | Aug. 11, 1931 |
| 1,941,106 | Park | Dec. 26, 1933 |
| 1,988,204 | Knudson | Jan. 15, 1935 |
| 2,415,997 | Eldred | Feb. 18, 1947 |
| 2,468,115 | Saul | Apr. 26, 1949 |
| 2,584,466 | Kaserman | Feb. 5, 1952 |
| 2,596,386 | Egge | May 13, 1952 |
| 2,609,108 | Peterson et al. | Sept. 2, 1952 |
| 2,613,861 | Goerlitz | Oct. 14, 1952 |
| 2,648,181 | Dalton | Aug. 11, 1953 |
| 2,662,646 | McCain | Dec. 15, 1953 |
| 2,667,420 | Meulemans et al. | Jan. 26, 1954 |
| 2,707,567 | Bisset et al. | May 3, 1955 |
| 2,750,659 | Sassi | June 19, 1956 |